United States Patent
Jose et al.

(10) Patent No.: US 10,326,864 B2
(45) Date of Patent: Jun. 18, 2019

(54) DYNAMIC ORCHESTRATION OF MICROSERVICES

(71) Applicant: SAP SE, Walldorf (DE)

(72) Inventors: Aby Jose, Bangalore (IN); Vikas Gupta, Bangalore (IN); Shruti Hansoge Ramesh, Bangalore (IN)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 15/433,558

(22) Filed: Feb. 15, 2017

(65) Prior Publication Data

US 2018/0234523 A1    Aug. 16, 2018

(51) Int. Cl.
*H04L 29/06* (2006.01)
*H04L 29/08* (2006.01)
*H04L 12/24* (2006.01)

(52) U.S. Cl.
CPC .............. *H04L 67/42* (2013.01); *H04L 41/06* (2013.01); *H04L 67/10* (2013.01); *H04L 67/34* (2013.01)

(58) Field of Classification Search
CPC ......... H04L 41/06; H04L 67/10; H04L 67/34; H04L 67/42
See application file for complete search history.

(56) References Cited

U.S. PATENT DOCUMENTS

| | | | | |
|---|---|---|---|---|
| 7,555,742 | B2 * | 6/2009 | Iborra | G06F 8/30 717/101 |
| 9,875,086 | B1 * | 1/2018 | Anderson | G06F 8/60 |
| 2012/0203877 | A1 * | 8/2012 | Bartholomay | H04L 63/0227 709/221 |
| 2013/0297685 | A1 | 11/2013 | McGrath et al. | |
| 2015/0109967 | A1 * | 4/2015 | Hogan | H04M 15/66 370/259 |

(Continued)

FOREIGN PATENT DOCUMENTS

EP    2104314 A1    9/2009

OTHER PUBLICATIONS

Beverly Schwartz et al; Smart Packets for active networks; Proceedings of 1999 IEEE Second Conference on Open Architectures and Network Programming (Openarch '99) 8 pages; (http://ieeexplore.ieee.org/document/758557/).

(Continued)

*Primary Examiner* — Mohamed A. Wasel
(74) *Attorney, Agent, or Firm* — Buckley, Maschoff & Talwalkar LLC (57) ABSTRACT

A request with data is received at an execution environment of an application. In response to the request, a first network packet is automatically created. The first network packet includes the data, orchestration code and application code of the application. The first network packet is sent to a first network node. The first network node executes a first section of the application code in a node execution environment. The section to be executed is determined based on the orchestration code. In response to the execution, a microservice associated with the application is invoked. Upon receiving a response from the microservice, a second network packet is dynamically generated. The second network packet includes the received response, the orchestration code, and one or more sections of the application code. The second network packet is sent to a second network node.

17 Claims, 7 Drawing Sheets

(56) References Cited

U.S. PATENT DOCUMENTS

2016/0124742 A1* 5/2016 Rangasamy ............ H04L 47/70
717/103
2016/0147529 A1 5/2016 Coleman et al.
2016/0196129 A1* 7/2016 Al Hamami ............ H04L 67/02
717/169
2017/0289307 A1* 10/2017 Thompson .......... H04L 41/0823

OTHER PUBLICATIONS

Stephen F. Bush; Introduction to Active Networks; copyright 2002; 86 pages; (http://videolectures.net/contrib07_bush_lan/).
Martin Fowler et al; Microservices; 16 pages; published online 2014; retrieved on Feb. 15, 2017 from (https://martinfowler.com/articles/microservices.html#SmartEndpointsAndDumbPipes).
Wikipedia; Active networking; 4 pages; retrieved on Feb. 15, 2017 from (https://en,wikipedia.org/wiki/Active_networking).
Michael W. Hicks et al; PLAN: A Packet Language for Active Networks; May 25, 2006; 51 pages; (http://www.cs.umd.edu/~mwh/papers/plan-extended.pdf).
"Communication: European Extended Search Report", dated Dec. 7, 2018 (dated Jul. 12, 2018), European Patent Office, European Application No. 18000109.1-1213, 8pgs.

* cited by examiner

```
@Client side,
        Packet.Create (Program A)
        Packet.Send()
@Active Node1,
        Packet.Execute (A_SectionA.1)
        Packet.createNew(A_SectionA.2->End)
        Packet.send()
@Active Node2,
        Packet.Execute(A_SectionA.2)
        Packet.createNew(A_SectionA.3->End)
        Packet.send()
@Active Node3,
        Packet.Execute(A_SectionA.3)
        If (Section_exists = false)
                Packet.createNew(programA.Response)
                        Packet.send(Response)
```

DYNAMIC ORCHESTRATION OF MICROSERVICES

FIELD

Embodiments described herein generally relate to transferring data among a number of spatially distributed (i.e., situated at separate locations) computers or digital data processing systems, via one or more communications (e.g., computer networks). Further, managing the resources of the computers connected by a computer network or managing the resources of the network are described.

BACKGROUND

Typically, software development conforms to pre-defined software architectures that determine the fundamental structures of the software systems. Microservices architecture is a type of software architecture where applications are developed as suites of microservices. Microservices are deployed independently, run in separate computing processes and, therefore, can be modified independently, without redeploying the entire application. Thus, by being independently replaceable and independently upgradeable, microservices complement software componentization.

Microservices typically communicate with lightweight network communication mechanisms such as a resource Application Programming Interface (API) over Hyper Text Transfer Protocol (HTTP). Application execution environments integrate and consume microservices of the suites of microservices. Generally, the application execution environments send input data to and receive output data from the microservices via HTTP request-response messages. However, the communication between the application execution environments and the microservices causes a significant data traffic. As a consequence, performance of applications is often reduced.

BRIEF DESCRIPTION

According to some embodiments, a computer-implemented method to orchestrate services includes receiving a first network packet comprising data, source code, and a destination identifier specifying a destination of a second network packet executing a first section of the source code; in response to the execution, invoking a service associated with an application; receiving a first response from the service; dynamically generating the second network packet, wherein the second network packet comprises the first response and one or more remaining sections of the source code; and sending the second network packet to the destination specified by the destination identifier.

According to some embodiments, a computer system to dynamically orchestrate services includes at least one processor and memory that execute program code, the program code comprising: a client that sends a first network packet comprising data, source code, and a destination identifier specifying a destination of a second network packet; and a first network node that receives the first network packet, executes a first section of the source code, invokes, in response to the execution of the first section of the source code, a service associated with an application, and dynamically generates, upon receiving a first response from the service, a second network packet comprising the first response and one or more remaining sections of the source code.

According to some embodiments, a non-transitory computer readable medium storing instructions which when executed by at least one processor cause a computer system to perform operations including: receive a first network packet comprising data, source code, and a destination identifier specifying a destination of a second network packet; execute a first section of the source code; in response to the execution, invoke a service associated with an application; receive a first response from the service; dynamically generate the second network packet, wherein the second network packet comprises the first response and one or more remaining sections of the source code; and send the second network packet to the destination specified by the destination identifier.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for orchestration of microservices are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Figure 1:
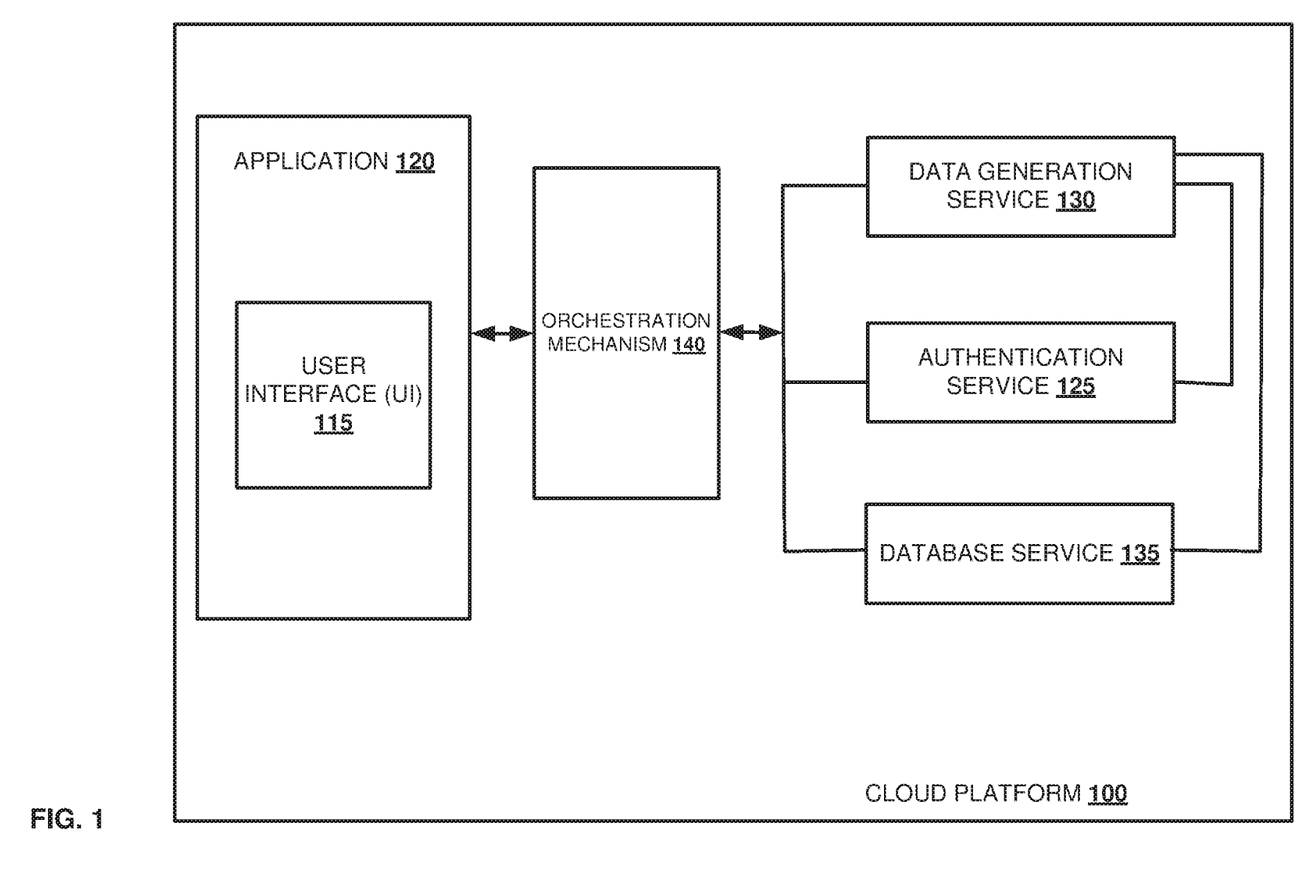
FIG. 1 is a block diagram illustrating a cloud platform to provide a number of microservices, according to one embodiment.

FIG. 1 is a block diagram illustrating a cloud platform 100 to provide a number of microservices, according to one embodiment. Cloud platform 100 may include functionality such as resource pooling, where the computing resources of a cloud infrastructure provider are pooled to serve multiple consumers, e.g., utilizing a multi-tenant model. Cloud platform 100 may provide scalability that refers to the capability of the platform to flexibly provision and release computing resources to scale commensurate with demand. Further, the capabilities of cloud platform 100 to automatically control, monitor, report, and optimize resource usage may be referred by one or more metering characteristics exposed by cloud platform 100. The one or more metering characteristics may refer the capabilities at some level of abstraction appropriate to the type of service, for example, storage, processing, bandwidth, and active user accounts, and so on.

Cloud platform 100 can be viewed as containing both a hardware layer and an abstraction layer. The hardware layer includes hardware resources to support cloud services being provided. The abstraction layer may include software deployed across the hardware layer, which manifests functionalities provided by cloud platform 100. For example, cloud platform 100 may provide application runtime, user interface (UI) development toolkits, internal configurations, cloud services such as connectivity service, persistence service, identity service, feedback service, document service, etc. The functionality provided by cloud platform 100 can be utilized by customers of cloud platform 100 to develop and/or deploy software applications on cloud platform 100. In one embodiment, the software applications may be developed via functionality of cloud platform 100. In one embodiment, cloud platform 100 may also provide support for application lifecycle process, for example, installation, deployment, provisioning and maintenance of applications that may be built, installed, deployed, and run on cloud platform 100. In one embodiment, the abstraction layer of the cloud platform 100 may be platform-as-a-service implemented in Java® programming language.

In one embodiment, authentication service 125 is an independent microservice deployed on cloud platform 100. Authentication service 125 is provided by cloud platform 100 to applications running on cloud platform 100. In one embodiment, authentication service 125 is deployed independently and runs as a separate computing process on cloud platform 100. Further, authentication service 125 can be updated independently, without affecting other parts of a corresponding application.

In one embodiment, application 120 is deployed on cloud platform 100. Application 120 is associated with a number of microservices such as authentication service 125. Application 120 runs in a corresponding execution environment provided by cloud platform 100, e.g., through the application runtime functionality of cloud platform 100.

In one embodiment, application 120 is responsible for authentication of a user when a request from the user is received. The user authentication functionality is delivered to application 120 by authentication service 125. Application 120 is configured to request authentication of users from authentication service 125. Authentication service 125 includes predefined user authentication instructions, according to one embodiment. When a user authentication request is received, authentication service 125 executes the user authentication instructions and returns a response to application 120. The response from authentication service 125 may include either a confirmation message (e.g., when the user is successfully authenticated), or an error message (e.g., when the user authentication is unsuccessful). Further, the response from authentication service 125 may include data for the authenticated user in addition to (or instead of) the confirmation message when the user is successfully authenticated.

In addition to authentication service 125, application 120 may be associated with other microservices, such as data generation service 130 and database service 135. In one embodiment, authentication service 125, data generation service 130 and database service 135 are consumed by application 120. It should be appreciated that cloud platform 100 may provide various microservices in addition to authentication service 125, data generation service 130, and database service 135. Such services can be independently deployed on cloud platform 100 as standalone microservices. The services can be consumed by a number of applications built and/or deployed on cloud platform 100. Further, application 120 may consume one or more of the microservices provided by cloud platform 100 in addition to (or instead of) authentication service 125, data generation service 130, and database service 135.

In one embodiment, application 120 includes user interface (UI) 115. UI 115 can be accessed by a user of application 120 via different types of client systems that are either internal or external to cloud platform 100. The client systems include, but are not limited to, web browsers, voice browsers, application clients, and other software that may access, consume and display web content.

In one embodiment, a request to application 120 includes invoking one or more microservices consumed by application 120. For example, when the user switches from a first screen to a second screen of UI 115, a data generation request may be created at UI 115 of application 120. Data generation service 130 may be invoked to generate the second screen of UI 115. For the second UI screen to be generated by data generation service 130, the user may have to be authenticated and data may have to be retrieved from a database. Therefore, the request to change from the first UI screen to the second UI screen may include invoking, e.g., in background, at least authentication service 125 to authenticate the user, database service 135 to retrieve data from the database, and data generation service 130 to generate the second UI screen with the retrieved data.

In one embodiment, cloud platform 100 includes orchestration mechanism 140 that manages communication on a network layer level between microservices consumed by applications that run on cloud platform 100. The cloud services provided by cloud platform 100 can communicate through an open network such as the Internet or through a restricted network that is internal for cloud platform 100. For example, the services provided by cloud platform 100 can communicate through an intranet of an organization that owns and/or manages cloud platform 100.

In one embodiment, in accordance with orchestration mechanism 140, network communication between the services is directed through one or more active network nodes. An active network node includes both a functionality of routing network traffic and a capability to perform computations (e.g., execute source code). The computation capability can provide an instrumentation to dynamically modify operations of a network that includes one or more active nodes. This way, performance of applications running on cloud platform 100 can be enhanced. In one embodiment, one or more active nodes of a communication network may orchestrate communication between microservices consumed by application 120.

Figure 2:
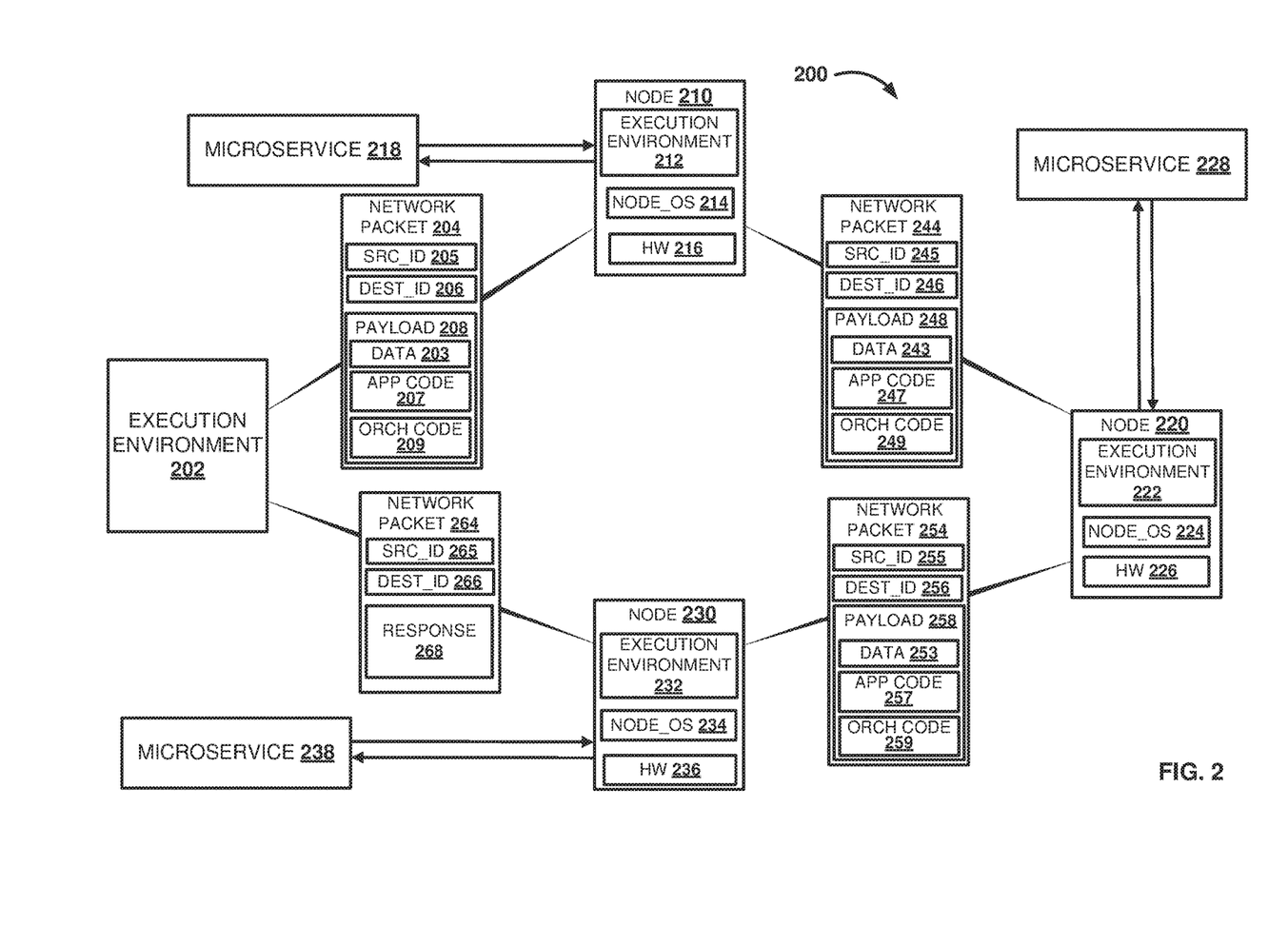
FIG. 2 is a block diagram illustrating a network architecture to dynamically orchestrate communication between microservices, according to one embodiment.

FIG. 2 is a block diagram illustrating a network architecture 200 to dynamically orchestrate communication between microservices, according to one embodiment. In one embodiment, network architecture 200 facilitates communication, on a network layer level, between cloud services provided by cloud platform 100 described above with reference to FIG. 1.

In one embodiment, network architecture 200 is an architecture of an active network. Network packets flowing through the active network dynamically modify the operation of the network. In one embodiment, network packets travelling between network nodes of the network include input data and source code. In one embodiment, the network packets comply with an appropriate network protocol that supports transfer of both data and source code within a network packet. For example, the network packets can be encapsulated within an Active Networks Encapsulation Protocol (ANEP). Such network packets can be referred to as smart network packets. For example, when an application is built as a suite of microservices, application code can be divided into sections and sent via the smart network packets for section-by-section execution at one or more active network nodes. In one embodiment, the application code defines the order in which the microservices that represent different application building blocks have to be invoked. Further, network nodes of the network are capable of executing the code from the network packets, as well as routing the network packets.

A microservice is defined to be independent and self-contained entity serving one or more purposes. Microservices are remotely consumed via HTTP request-response messages (generally via APIs exposed by the microservices). For example, when an application includes three microservices, an execution environment of the application orchestrates the microservices by sending a network packet to each of the three microservices and receiving a network packet from each of the three microservices in response. However, with such communication architecture where logic is applied at the endpoints and the HTTP request-response messages cause the response to be pulled from microservices to the execution environment, large amount of data traffic is generated between connecting networks. In addition, performance of corresponding applications is restricted by the speed of the connecting networks. Thus, since the large amount of data traffic affects negatively the speed of the connecting networks, the performance of the corresponding applications is significantly reduced by the request-response messages between microservices and execution environments. At least some of the technologies described herein address these problems by injecting microservices' orchestration logic, application logic, and data into smart network packets and by executing sections of the orchestration and application logic in one or more active network nodes that provide the required execution environment. This way, when the application includes three microservices, the execution environment of the application sends a smart network packet with application and orchestration logic, and data to a smart network node and receives in response a smart network packet from the same or different smart network node. In this case, the one or more active network nodes orchestrate the microservices by executing the orchestration logic and the application logic from the smart network packets.

In one embodiment, a data generation service of the application is triggered. Referring to the example of the data generation request described above with reference to FIG. 1, a user interface (UI) action may create the data generation request. In response to the data generation request, data generation service 130 of application 120 is triggered. Execution environment 202 provides a runtime environment where application code of a corresponding application (e.g., application 120) is executed. Execution environment 202 manages communication between services consumed by application 120. Execution environment 202 executes the application code and transforms the data generation request into a call to the data generation service (e.g., a HyperText Transfer Protocol (HTTP) resource Application Programming Interface (API) call). Execution environment 202 calls the data generation service to generate data and return a response to execution environment 202.

In one embodiment, on a network layer level, network packet 204 is generated based on the call from execution environment 202 to the data generation service. Network packet 204 is automatically generated to transport data to the data generation service. Source code and data are injected into network packet 204. Alternatively, executable instructions may be injected into network packet 204 in various forms different from source code. Examples include but are not limited to intermediate representation (IR) code, object code, machine code, etc. In one embodiment, the source code injected in network packet 204 includes application code and orchestration code. In one embodiment, network packet 204 is generated by a network node that sends the request to the data generation service. In one embodiment, network packet 204 can be generated by a client system accessing a UI generated by execution environment 202. In one embodiment, execution environment 202 is an execution environment of a cloud application (e.g., application 120 that runs on cloud platform 100). Alternatively, execution environment may be part of the client system that accesses application 120.

In one embodiment, network packet 204 includes SRC_ID 205, DEST_ID 206, and payload 208. SRC_ID 205 is an identifier of a network node that sends network packet 204 (e.g., the client system) to node 210. DEST_ID 206 is an identifier of a destination network node for a subsequent network packet (e.g., network packet 244). Based on DEST_ID 206, node 210 determines where to send network packet 244. Further, network packet 204 includes payload 208. Payload 208 includes data 203 (e.g., user name), application code (APP CODE) 207, and orchestration code (ORCH CODE) 209, according to one embodiment. For example, in accordance with ORCH CODE 209 and APP CODE 207, network packet 204 may instruct node 210 to invoke one or more microservices (e.g., such as the data generation service) with data 203 received with network packet 204. It should be appreciated, however, that payload 208 may include either APP CODE 207 or ORCH CODE 209. Further, application code and orchestration code may be combined in one portion of source code within payload 208.

In one embodiment, node 210 is an active network node. Node 210 includes hardware (HW) 216, operating system NODE_OS 214, and execution environment 212. HW 216 is capable of executing source code, as well as routing network traffic. NODE_OS 214 is a software that runs on HW 216 and manages HW 216 and other software resources of node 210. In one embodiment, one or more execution environments such as execution environment 212 can run on and be managed by NODE_OS 214. Node 210 can be an active electronic device that is attached to a network and is capable of creating, receiving, and/or transmitting information over the network. Examples of node 210 include, but are not limited to, a modem, hub, bridge, switch, router, digital telephone handset, a printer or a host computer, such as a workstation or a server.

In one embodiment, APP CODE 207 is divided into a number of sections. Further, ORCH CODE 209 defines a first section of APP CODE 207 to be executed by node 210 on data 203. In accordance with ORCH CODE 209, node 210 executes the first section of APP CODE 207 and invokes microservice 218 with data 203 (e.g., user name) delivered within payload 208.

Microservice 218 is an authentication service, according to one embodiment. Microservice 218 corresponds to authentication service 125 described above with reference to FIG. 1. Microservice 218 is deployed on a cloud platform and consumed independently by one or more applications that run on the cloud platform. Microservice 218 provides a certain functionality (e.g., user authentication) to consuming applications. When invoked, microservice 218 authenticates an application user and returns a response. The response from microservice 218 can include either a confirmation message (e.g., confirming the user has been successfully authenticated) or an error message (e.g., when the user authentication has been unsuccessful). Further, the response from microservice 218 may include data for the authenticated user in addition to (or instead of) the confirmation message when the user is successfully authenticated. For example, when microservice 218 is invoked with a name of a user, the response from microservice 218 may include other user attributes such as user role, user rights, user group, user e-mail, etc.

In one embodiment, node 210 is configured to dynamically generate network packet 244. Based on ORCH CODE 209, node 210 includes APP CODE 247 in payload 248, as well as data 243 and ORCH CODE 249. In one embodiment, ORCH CODE 249 is a copy of ORCH CODE 209 that is originally part of network packet 204. APP CODE 247 represents one or more sections of APP CODE 207 that remain when the first section of APP CODE 207 is executed. Data 243 represents the response received from microservice 218. In one embodiment, based on ORCH CODE 209, data 243 may include zero or more data elements from data 203. Based on ORCH CODE 209, node 210 sends network packet 244 to a next network node. The next network node is determined by DEST_ID 206. Therefore, in accordance with ORCH CODE 209 and DEST_ID 206, node 210 sends network packet 244 to node 220. In addition to payload 248, network packet 244 includes SRC_ID 245 that identifies a network node that sends network packet 244 (e.g., node 210) and DEST_ID 246 that identifies a destination network node for a subsequent network packet (e.g., network packet 254). Based on DEST_ID 246, node 220 can determine the destination for network packet 254.

In one embodiment, node 220 is an active network node. Node 220 includes node hardware (HW) 226, a node operating system NODE_OS 224, and at least one execution environment 222. Node 220 receives network packet 244 and automatically executes one or more sections of APP CODE 247, as specified by ORCH CODE 249. Based on the execution, node 220 invokes microservice 228. In one embodiment, microservice 228 is a database service provided by a cloud platform. Microservice 228 is independently deployed on the cloud platform. Microservice 228 retrieves data from a database and returns a response to node 220. Further, in accordance with ORCH CODE 249, node 220 dynamically generates network packet 254. Node 220 includes in payload 258, as APP CODE 257, at least one section of APP CODE 247 left upon the execution of the one or more sections of APP CODE 247. Further, node 220 includes in payload 258 the retrieved data from microservice 228 (e.g., data 253), as well as ORCH CODE 259, according to one embodiment. ORCH CODE 259 represents a copy of ORCH CODE 249 from network packet 244. In one embodiment, network packet 254 includes SRC_ID 255 and DEST_ID 256 in addition to payload 258. Network packet 254 is sent from node 220 to a next network node. Destination of network packet 254 is determined by the DEST_ID 246 identifier.

In one embodiment, node 230 receives network packet 254. Node 230 is an active network node. Node 230 includes hardware (HW) 236, an operating system NODE_OS 234, and one or more execution environments 232. In accordance with ORCH CODE 259, node 230 executes the at least one section of the application code included in APP CODE 257 with data 253. In one embodiment, based on APP CODE 257, data 253 is sent to microservice 238. In one embodiment, microservice 238 is a data generation service. Microservice 238 is invoked to generate a UI screen with data 253. Microservice 238 returns a response including the generated UI screen to node 230.

In one embodiment, node 230 is configured to generate a network packet containing the received data from microservice 238. Based on ORCH CODE 259, node 230 might perform a check to determine whether there are more not-executed sections left in APP CODE 257. In various embodiments, APP CODE 257 may include either the entire application code with sections marked as executed by corresponding network nodes or only sections of the application code that are still not executed. Based on the check, node 230 might send the generated network packet to either a subsequent network node, or to the network node that initiated the communication. In one embodiment, node 230 determines that sections of APP CODE 257 are executed and, therefore, generates and sends network packet 264. Network packet 264 includes response 268, source identifier SRC_ID 265, and destination identifier DEST_ID 266. In one embodiment, response 268 includes the response from microservice 238.

Figure 3:
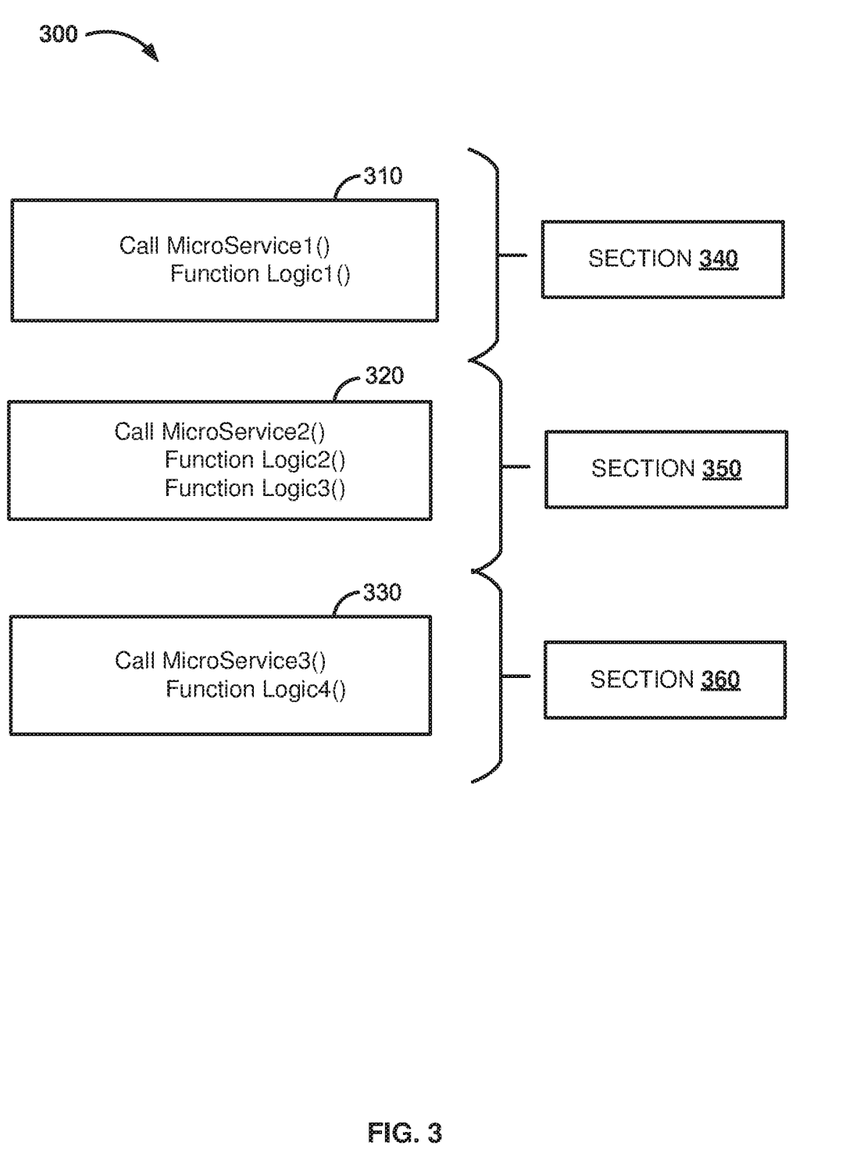
FIG. 3 is block diagram illustrating an exemplary application code divided into sections, according to one embodiment.

FIG. 3 is a block diagram illustrating an exemplary application code 300 divided into sections, according to one embodiment. Exemplary application code 300 includes first portion of code 310, second portion of code 320, and third portion of code 330. In one embodiment, exemplary application code 300 is divided into sections 340, 350, and 360 for section-by-section execution. For example, section 340 is executed at a first network node (e.g., node 210 described above with reference to FIG. 2), section 350 is executed at a second network node, and section 360 is executed at a third network node. Sections 340, 350, and 360 correspond to first portion of code 310, second portion of code 320, and third portion of code 330, respectively.

In one embodiment, application code portions from sections 340, 350, and 360 are executed in different execution environments at different network nodes, as described above with reference to FIG. 2. It should be appreciated, however, that various embodiments may include networks combining one or more active network nodes and one or more passive network nodes (e.g., network nodes capable of routing network traffic but not capable to execute source code). Further, each of the active nodes may include one or more execution environments. Each of a number of network nodes may execute one or more sections of exemplary application code 300 in the one or more execution environments.

Figure 4:
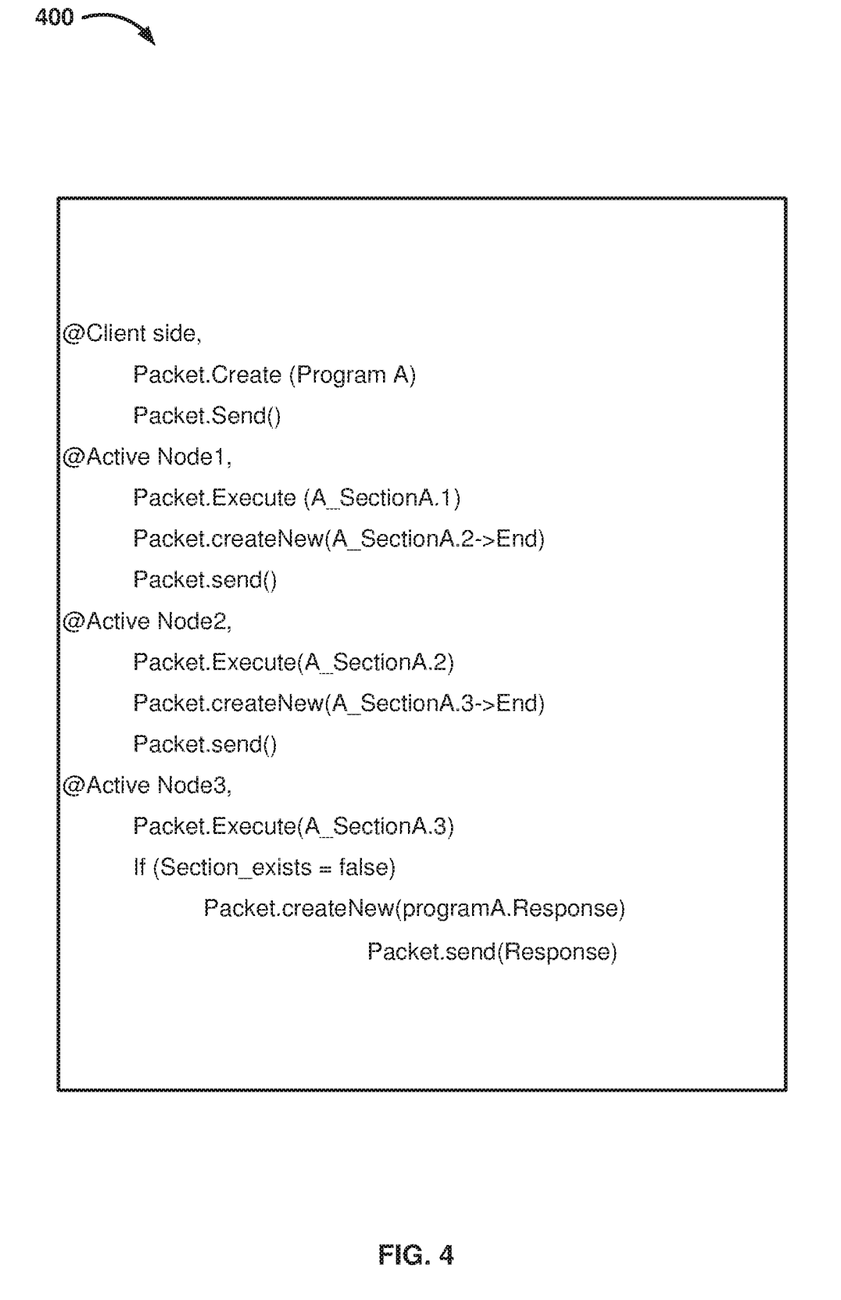
FIG. 4 is an exemplary orchestration code, according to one embodiment.

FIG. 4 is an exemplary orchestration code 400, according to one embodiment. Orchestration code 400 defines one or more actions to be performed at each node of a network. For example, according to orchestration code 400, a first network packet that includes code of exemplary program "A" has to be created at client side. Further, at a first active node, a first section of program "A" has to be executed, while remaining sections of program "A" have to be included in a second network packet. Consequentially, at a second active node, a second section of program "A" has to be executed and sections that further remain have to be included in a third network packet and so on. In one embodiment, an active node that executes a last section of program "A" (e.g., a third active node) generates and sends a response packet that includes a response of the execution of program "A".

Figure 5A:
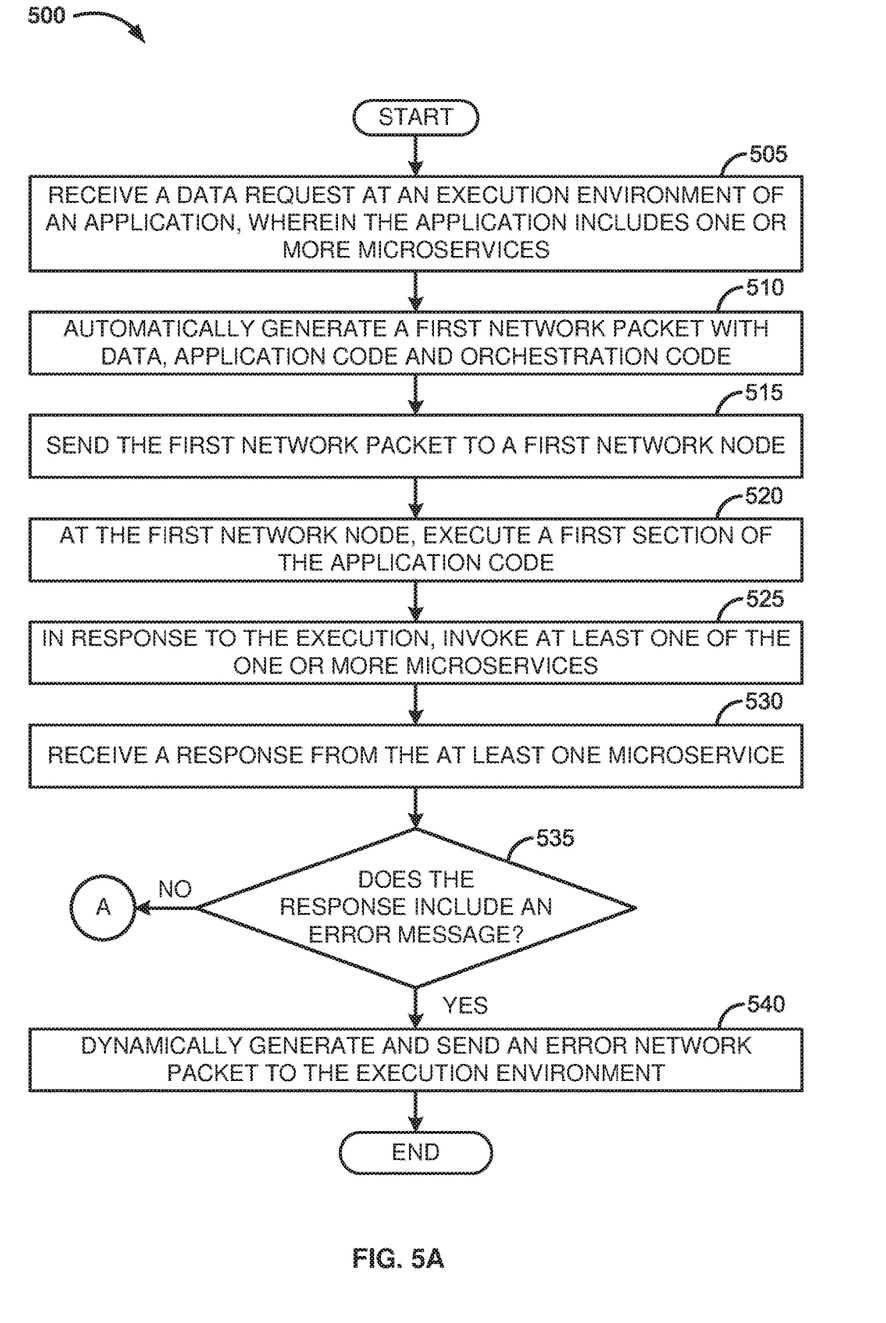
FIGS. 5A-5B are flow diagrams illustrating a process to dynamically orchestrate a number of microservices, according to one embodiment.
Figure 5B:
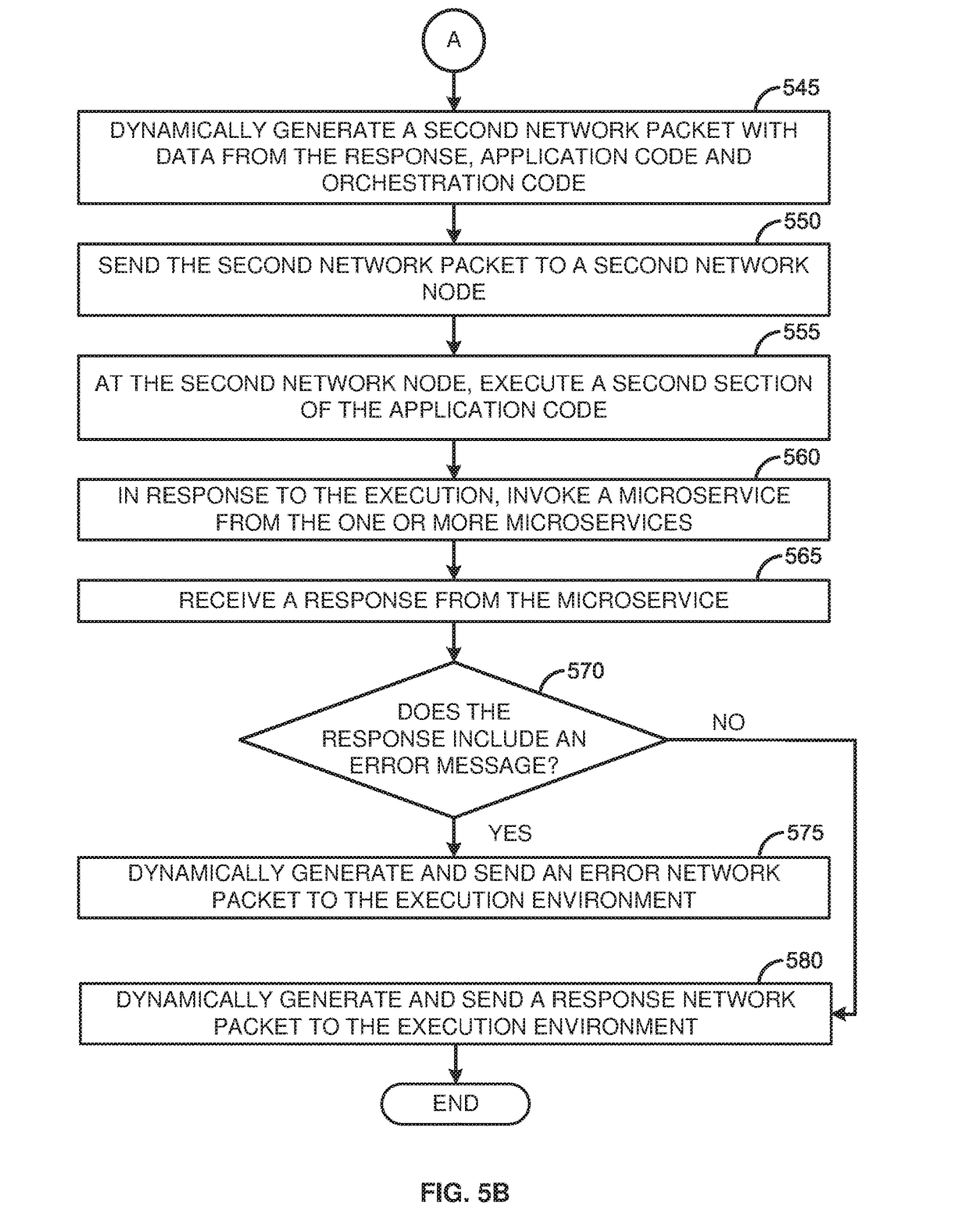

FIGS. 5A-5B are flow diagrams illustrating a process 500 to dynamically orchestrate a number of microservices, according to one embodiment. Process 500 starts at 505 (FIG. 5A) where a data request is received at an execution environment of an application. In one embodiment, the application is associated with one or more microservices. The one or more microservices may be part of the originally designed application. The microservices may also be unrelated services that developers of the application access as one or more nodes in a pre-defined microservices strategy obtaining pre-existing services from other cloud services via orchestration code. At 510, a first network packet is automatically generated based on the data request. In one embodiment, the first network packet is generated at a client system that accesses a UI generated by the execution environment.

In one embodiment, the first network packet includes data, code of the application, and orchestration code. The code of the application defines functionalities of the application. For example, when the application is developed as a suite of microservices, the application code defines order and parameters for a microservice to be invoked. Further, the application code may be divided into sections for section-by-section execution. Additionally, the orchestration code specifies network nodes that have to execute sections of the application code. For example, the orchestration code may specify that a first section of the application code has to be executed at a first network node. The orchestration code also defines creation of subsequent network packets, according to one embodiment. The orchestration code may also direct execution at other microservices available on the cloud platform in any order with microservices created by a third party or with microservices created on the cloud platform.

At 515, the first network packet is sent to a first network node. Next, at 520, a first section of the application code is executed. In one embodiment, the section of application code to be executed at the first network node is determined by the orchestration code. In one embodiment, the first network node includes hardware capable of both executing source code and routing network packets, a node operating system, and at least one execution environment managed by the operating system. The first network node executes the first section of the application code within the at least one execution environment. In response to the execution, at 525, at least one of the one or more microservices of the application is invoked. In one embodiment, the first network node sends the data received with the first network packet to the at least one microservice for processing. For example, the received data may be a name of a user and the at least one microservice may be an authentication service. In such case, the first network node may send the name of the user to the authentication service for authentication.

Next, at 530, a response is received from the at least one microservice. Upon receiving the response, at 535, a check is performed to determine whether an error message is included in the response. For example, the authentication service may respond with an error message when authentication of the user is not successful. When it is determined that the response from the at least one microservice includes an error message, at 540, an error network packet is dynamically generated and sent to the execution environment. Further, process 500 to dynamically orchestrate a number of microservices is discontinued.

When it is determined that the response from the at least one microservice does not include an error message, at 545 (FIG. 5B), a second network packet is dynamically generated. In one embodiment, the second network packet is generated by the first network node based on the orchestration code. The second network packet includes data from the response by the at least one microservice (e.g., user role and rights associated with the user role), the orchestration code, and sections of the application code that remain upon the first section of the application code has been executed. Further, at 550, the second network packet is sent to a second network node based on the orchestration instructions.

At 555, the second network node executes a second section of the application code. In one embodiment, the section to be executed by the second network node is determined by the orchestration code. In response to the execution, at 560, a microservice from the one or more microservices is invoked. It should be appreciated, however, that step 560, as well as step 525 of process 500 may include invoking of a number of microservices in response to executing one or more sections of the application code, as specified by the orchestration code.

Next, at 565, a response from the microservice is received. For example, the microservice may be a database service and the response may include data retrieved from a database. Upon receiving the response, at 570, s check is performed to determine whether the response from the microservice includes an error message. In one embodiment, the response includes an error message and, therefore, an error network packet is dynamically generated, at 575, and sent to the execution environment. When it is determined the response from the microservice does not include an error message, at 580, a response network packet is dynamically generated and sent to the execution environment. The response network packet includes the response from the microservice.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java® programming language, C++, or other object-oriented programming language and development tools. Another embodiment may be implemented in hard-wired circuitry in place of, or in combination with machine readable software instructions.

Figure 6:
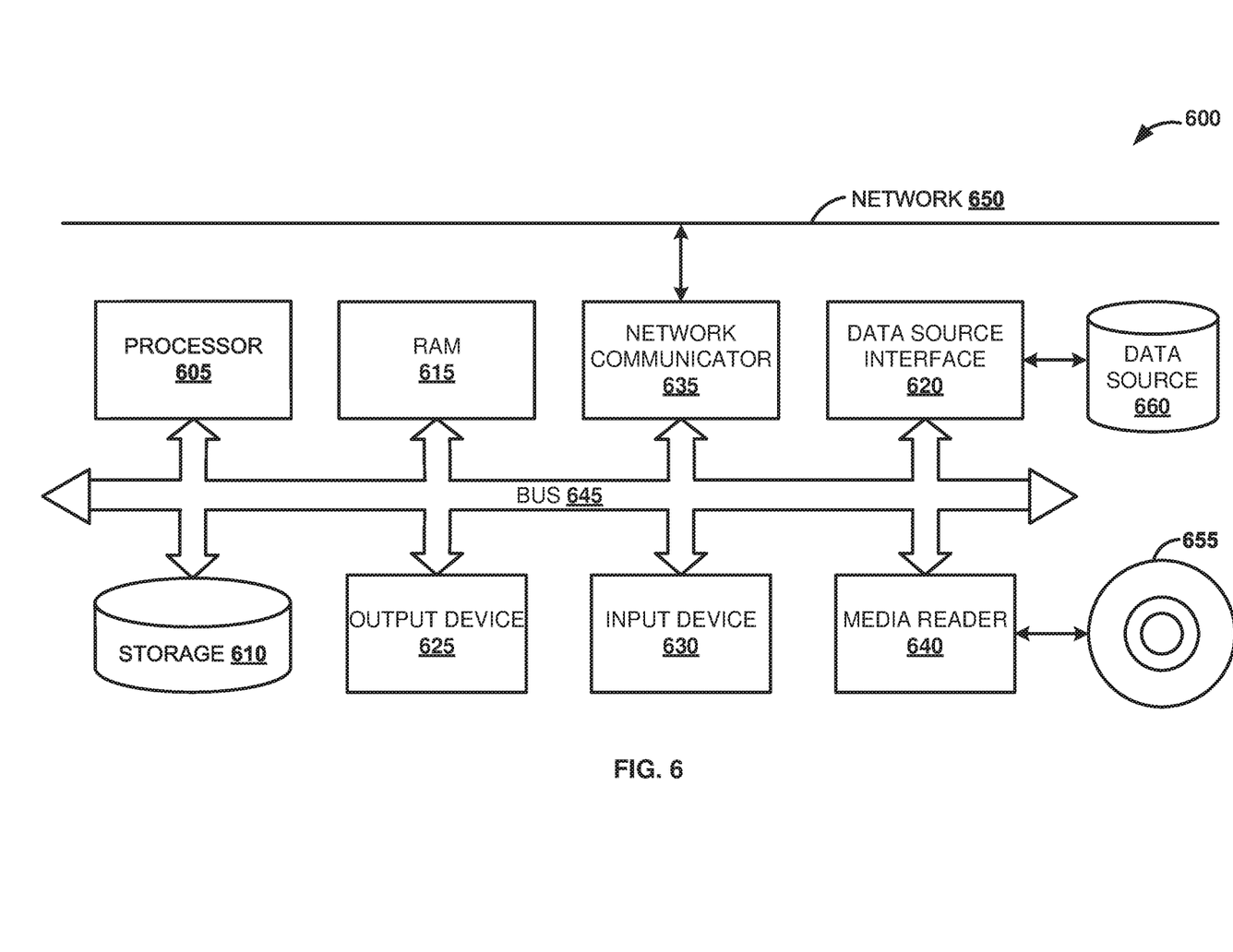
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method to orchestrate services, the method comprising:
receiving a first network packet comprising data, source code, and a destination identifier specifying a destination of a second network packet, wherein the source code comprises code of an application and orchestration code;
executing a first section of the code of the application;
in response to the execution, invoking a service associated with the application;
receiving a first response from the service;

dynamically generating the second network packet, wherein the second network packet comprises the first response and one or more remaining sections of the source code; and sending the second network packet to the destination specified by the destination identifier.

2. The method of claim 1, wherein the service is an independently deployed microservice that runs in a separate computing process.

3. The method of claim 1, wherein the first response comprises data from the service.

4. The method of claim 1, wherein the first response comprises an error message from the service.

5. The method of claim 1 further comprising:

based on the orchestration code, sending the second network packet to a second network node.

6. The method of claim 1 further comprising:

based on the orchestration code, sending the second network packet to the application.

7. A computer system to dynamically orchestrate services, the system comprising:

at least one processor and memory that execute program code, the program code comprising:

a client that sends a first network packet comprising data, source code, and a destination identifier specifying a destination of a second network packet, wherein the source code includes code of an application and orchestration code; and a first network node that receives the first network packet, executes a first section of the code of the application, invokes, in response to the execution of the first section of the code of the application, a service associated with the application, and dynamically generates, upon receiving a first response from the service, a second network packet comprising the first response and one or more remaining sections of the source code.

8. The computer system of claim 7, wherein the first network node comprises a node execution environment to execute the first section of the code of the application.

9. The computer system of claim 7, wherein the service is an independently deployed microservice that runs in a separate computing process.

10. The computer system of claim 7, wherein the first network node further sends the second network packet to the destination specified by the destination identifier.

11. The computer system of claim 10, wherein the second network packet further comprises:

an error message when the first response comprises an error; or a response data when the first response comprises data.

12. A non-transitory computer readable medium storing instructions which when executed by at least one processor cause a computer system to perform operations comprising:

receive a first network packet comprising data, source code, and a destination identifier specifying a destination of a second network packet, wherein the source code includes code of an application and orchestration code;

execute a first section of the code of the application;

in response to the execution, invoke a service associated with the application;

receive a first response from the service;

dynamically generate the second network packet, wherein the second network packet comprises the first response and one or more remaining sections of the source code; and send the second network packet to the destination specified by the destination identifier.

13. The computer readable medium of claim 12, wherein the service is an independently deployed microservice that runs in a separate computing process.

14. The computer readable medium of claim 12, wherein the first response comprises data from the service.

15. The computer readable medium of claim 12, wherein the first response comprises an error message from the service.

16. The computer readable medium of claim 12 further comprising instructions to:

based on the orchestration code, sending the second network packet to a second network node.

17. The computer readable medium of claim 12 further comprising instruction to:

based on the orchestration code, sending the second network packet to the application.

* * * * *